United States Patent
Furuhashi et al.

(10) Patent No.: US 10,024,331 B2
(45) Date of Patent: Jul. 17, 2018

(54) BLOWER AND AIR CONDITIONER USING SAME

(71) Applicant: Mitsubishi Electric Corporation, Tokyo (JP)

(72) Inventors: Takuya Furuhashi, Tokyo (JP); Takashi Matsumoto, Tokyo (JP); Yuki Ugajin, Tokyo (JP); Miho Ishikawa, Tokyo (JP); Mitsuhiro Shirota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 285 days.

(21) Appl. No.: 14/767,716

(22) PCT Filed: Aug. 6, 2013

(86) PCT No.: PCT/JP2013/071222
§ 371 (c)(1),
(2) Date: Aug. 13, 2015

(87) PCT Pub. No.: WO2014/136286
PCT Pub. Date: Sep. 12, 2014

(65) Prior Publication Data
US 2015/0377242 A1    Dec. 31, 2015

(30) Foreign Application Priority Data

Mar. 4, 2013 (JP) ................ 2013-041403

(51) Int. Cl.
*F24F 11/77* (2018.01)
*F04D 27/00* (2006.01)
(Continued)

(52) U.S. Cl.
CPC .......... *F04D 27/002* (2013.01); *F04D 17/10* (2013.01); *F04D 29/281* (2013.01);
(Continued)

(58) Field of Classification Search
CPC .. F24F 13/08; F24F 7/013; F24F 13/06; F24F 13/14
See application file for complete search history.

(56) References Cited

U.S. PATENT DOCUMENTS

| | | |
|---|---|---|
| 6,239,416 B1 | 5/2001 | Nomura et al. |
| 6,263,888 B1 | 7/2001 | Nomura et al. |

(Continued)

FOREIGN PATENT DOCUMENTS

| | | |
|---|---|---|
| CN | 1755257 A | 4/2006 |
| CN | 201628313 U | 11/2010 |

(Continued)

OTHER PUBLICATIONS

JP 04-048142 English Translation.*

(Continued)

*Primary Examiner* — Mark Laurenzi
*Assistant Examiner* — Shafiq Mian
(74) *Attorney, Agent, or Firm* — POSZ LAW GROUP, PLC

(57) ABSTRACT

A blower and an air conditioner that can generate airflow simulating that in the natural world are provided. The blower and the air conditioner each include: a fan configured to generate blowing air; a pair of vertical airflow direction vanes separated from each other as a left side and a right side on a front side of the fan, the pair of vertical airflow direction vanes causing the blowing air generated by the fan to be let out upward or downward; and a control section configured to drive the pair of vertical airflow direction vanes separately while varying a rotation frequency of the fan. Such configuration of the blower and the air conditioner enables generation of airflow simulating that in the natural world.

6 Claims, 13 Drawing Sheets

(51) Int. Cl.
  *F24F 1/00* (2011.01)
  *F04D 17/10* (2006.01)
  *F04D 29/28* (2006.01)
  *F04D 29/46* (2006.01)
  *F24F 11/79* (2018.01)
(52) U.S. Cl.
  CPC .......... *F04D 29/462* (2013.01); *F24F 1/0011* (2013.01); *F24F 11/77* (2018.01); *F24F 11/79* (2018.01); *Y02B 30/746* (2013.01)

(56) References Cited

U.S. PATENT DOCUMENTS

| | | |
|---|---|---|
| 2001/0015351 A1 | 8/2001 | Nomura et al. |
| 2002/0000435 A1 | 1/2002 | Nomura et al. |
| 2002/0179593 A1 | 12/2002 | Nomura et al. |
| 2012/0174608 A1* | 7/2012 | Kumamoto .......... F24F 11/0078 62/186 |

FOREIGN PATENT DOCUMENTS

| | | | |
|---|---|---|---|
| CN | 203785203 U | 8/2014 | |
| EP | 2363653 A2 * | 9/2011 | ............ F24F 1/0007 |
| JP | H04-48142 A | 2/1992 | |
| JP | H06-229612 A | 8/1994 | |
| JP | H06-265168 A | 9/1994 | |
| JP | H06-331204 A | 11/1994 | |
| JP | H07-120044 A | 5/1995 | |
| JP | H09-101807 A | 4/1997 | |
| JP | H10-110995 A | 4/1998 | |
| JP | H10-110997 A | 4/1998 | |
| JP | H10-111004 A | 4/1998 | |
| JP | H10-132360 A | 5/1998 | |
| JP | 2001-108280 A | 4/2001 | |
| JP | 2001-215043 A | 8/2001 | |
| JP | 2003-139379 A | 5/2003 | |
| JP | 2010-008004 A | 1/2010 | |
| JP | 2010-164268 A | 7/2010 | |
| JP | 2012-37172 A | 2/2012 | |

OTHER PUBLICATIONS

CN 201628313 U English Translation.*
CN 1755257 A English Translation.*
Extended European Search Report dated Oct. 13, 2016 issued in corresponding EP patent application No. 13877053.2.
Office Action dated Jun. 26, 2017 issued in corresponding CN patent application No. 201380074176.5 (and partial English translation).
International Preliminary Report on Patentability dated Sep. 17, 2015 for the corresponding international application No. PCT/JP2013/071222 (with English translation).
International Search Report of the International Searching Authority dated Sep. 10, 2013 for the corresponding international application No. PCT/JP2013/071222 (and English translation).
Office Action dated Jan. 18, 2017 issued in corresponding CN patent application No. 201380074176.5 (and partial English translation).
Office Action dated Sep. 6, 2017 issued in corresponding CN patent application No. 201380074176.5 (and English translation).
Office Action dated May 22, 2018 in the corresponding European Patent Application No. 13 877 053.2.

* cited by examiner 3a, 3b  1b  4a, 4b  5

BLOWER AND AIR CONDITIONER USING SAME

CROSS REFERENCE TO RELATED APPLICATIONS

This application is a U.S. national stage application of International Application No. PCT/JP2013/ 071222 filed on Aug. 6, 2013, and is based on Japanese Patent Application No. 2013-041403 filed on Mar. 4, 2013, the disclosures of which are incorporated by reference.

TECHNICAL FIELD

The present invention relates to a blower and an air conditioner using the same.

BACKGROUND ART

Air conditioners that vary a range of swing of airflow direction varying vanes have been proposed. Such air conditioners enable fluctuation of blowing air (see, for example, Patent Literature 1).

CITATION LIST

Patent Literature

Patent Literature 1: Japanese Patent Laid-Open No. 10-110997
Patent Literature 2: Japanese Patent Laid-Open No. 2001-108280
Patent Literature 3: Japanese Patent Laid-Open No. 6-265168
Patent Literature 4: Japanese Patent Laid-Open No. 9-101807
Patent Literature 5: Japanese Patent Laid-Open No. 6-331204
Patent Literature 6: Japanese Patent Laid-Open No. 7-120044

SUMMARY OF INVENTION

Technical Problem

However, in the case of the technique described in Patent Literature 1, it is difficult to vary an airflow speed. Therefore, it is difficult to generate airflow simulating that in the natural world.

The present invention has been made in view of the above problem. An object of the present invention is to provide a blower capable of generating airflow simulating that in the natural world and an air conditioner using the same.

Means for Solving the Problems

A blower of the present invention includes: a fan configured to generate blowing air; a pair of vertical airflow direction vanes separated from each other as a left side and a right side on a front side of the fan, the pair of vertical airflow direction vanes causing the blowing air generated by the fan to be let out upward or downward; and a control section configured to drive the pair of vertical airflow direction vanes separately while varying a rotation frequency of the fan.

An air conditioner of the present invention includes the above blower.

Advantageous Effect of Invention

The present invention enables generation of airflow simulating that in the natural world.

DESCRIPTION OF EMBODIMENTS

Figure 1:
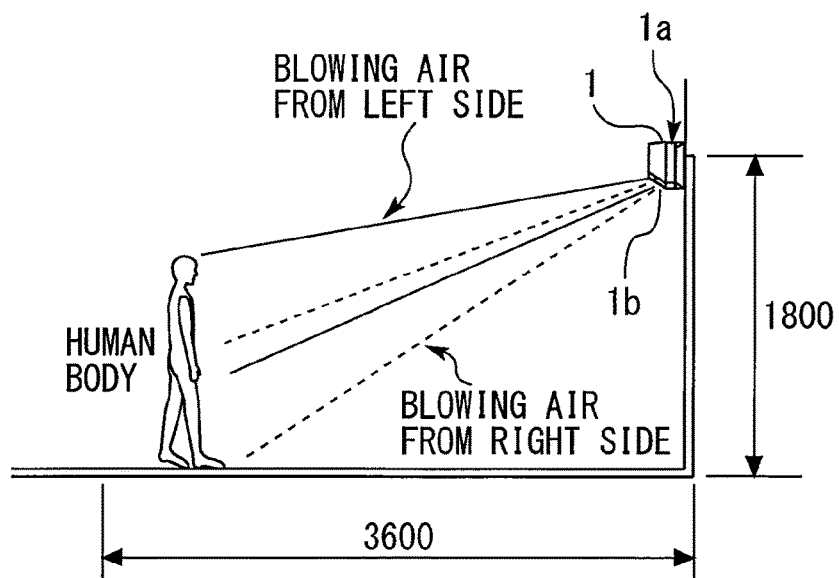
FIG. 1 is a side view of the inside of a room equipped with an air conditioner according to Embodiment 1 of the present invention.

Embodiments of the present invention will be described with reference to the attached drawings. In the drawings, parts that are identical or correspond to each other are provided with a same reference numeral. Overlapping descriptions thereof will arbitrarily be simplified or omitted.

Embodiment 1

Figure 2:
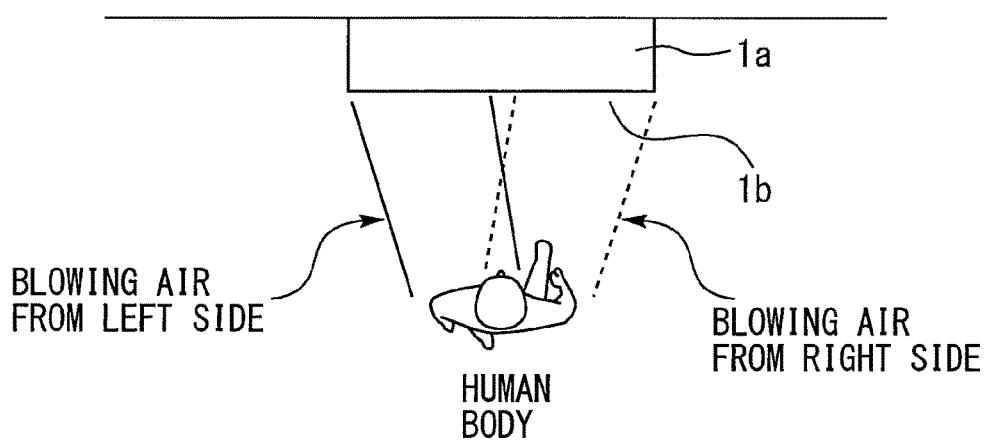
FIG. 2 is a plan view of the inside of the room equipped with the air conditioner according to Embodiment 1 of the present invention.

FIG. 1 is a side view of the inside of a room equipped with an air conditioner according to Embodiment 1 of the present invention. FIG. 2 is a plan view of the inside of the room equipped with the air conditioner according to Embodiment 1 of the present invention.

As illustrated in FIG. 1, a body 1 of an indoor unit of the air conditioner is provided on a wall of a room such as a household living room, an office or a shop. The body 1 is formed in a horizontally-long, rough rectangular parallelepiped shape. In an upper surface of the body 1, an air inlet 1a is provided. In a lower portion of a front surface of the body 1, an air outlet 1b is provided.

As illustrated in FIG. 1, at a certain point of time, the head of a human body is exposed to blowing air. The blowing air is let out from the left side of the air outlet 1b. The feet of the human body are also exposed to blowing air. The blowing air is let out from the right side of the air outlet 1b. In this case, as illustrated in FIG. 2, the left side of the human body is exposed to blowing air. The blowing air is let out from the left side of the air outlet 1b. The right side of the human body is also exposed to blowing air. The blowing air is let out from the right side of the air outlet 1b.

Next, details of the body 1 will be described with reference to FIGS. 3 and 4.

Figure 3:
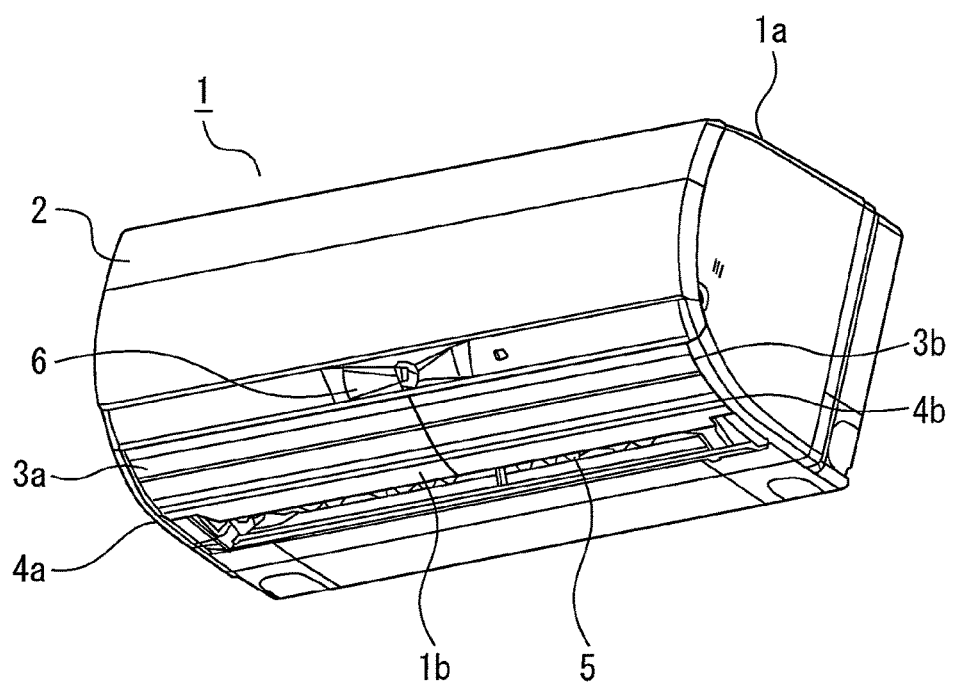
FIG. 3 is a front perspective view of the air conditioner according to Embodiment 1 of the present invention.

FIG. 3 is a front perspective view of the air conditioner according to Embodiment 1 of the present invention. FIG. 4 is a front perspective view of a state in which vanes of the air conditioner according to Embodiment 1 of the present invention are operating. FIG. 5 is a vertical cross-sectional view of an inner portion of the air conditioner according to Embodiment 1 of the present invention.

Figure 4:
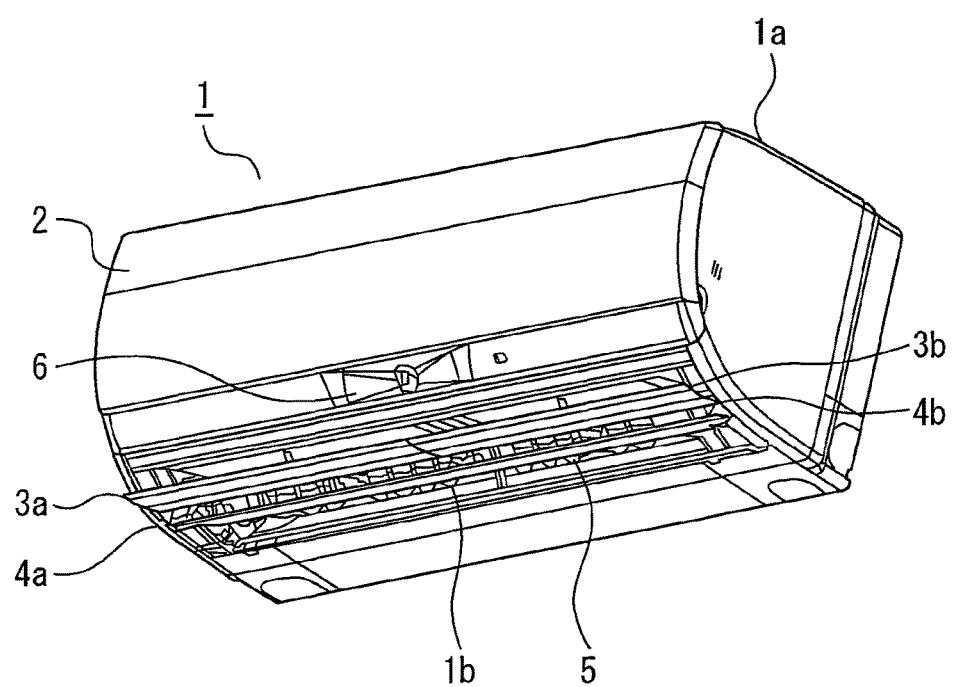
FIG. 4 is a front perspective view of a state in which vanes of the air conditioner according to Embodiment 1 of the present invention are operating.
Figure 5:
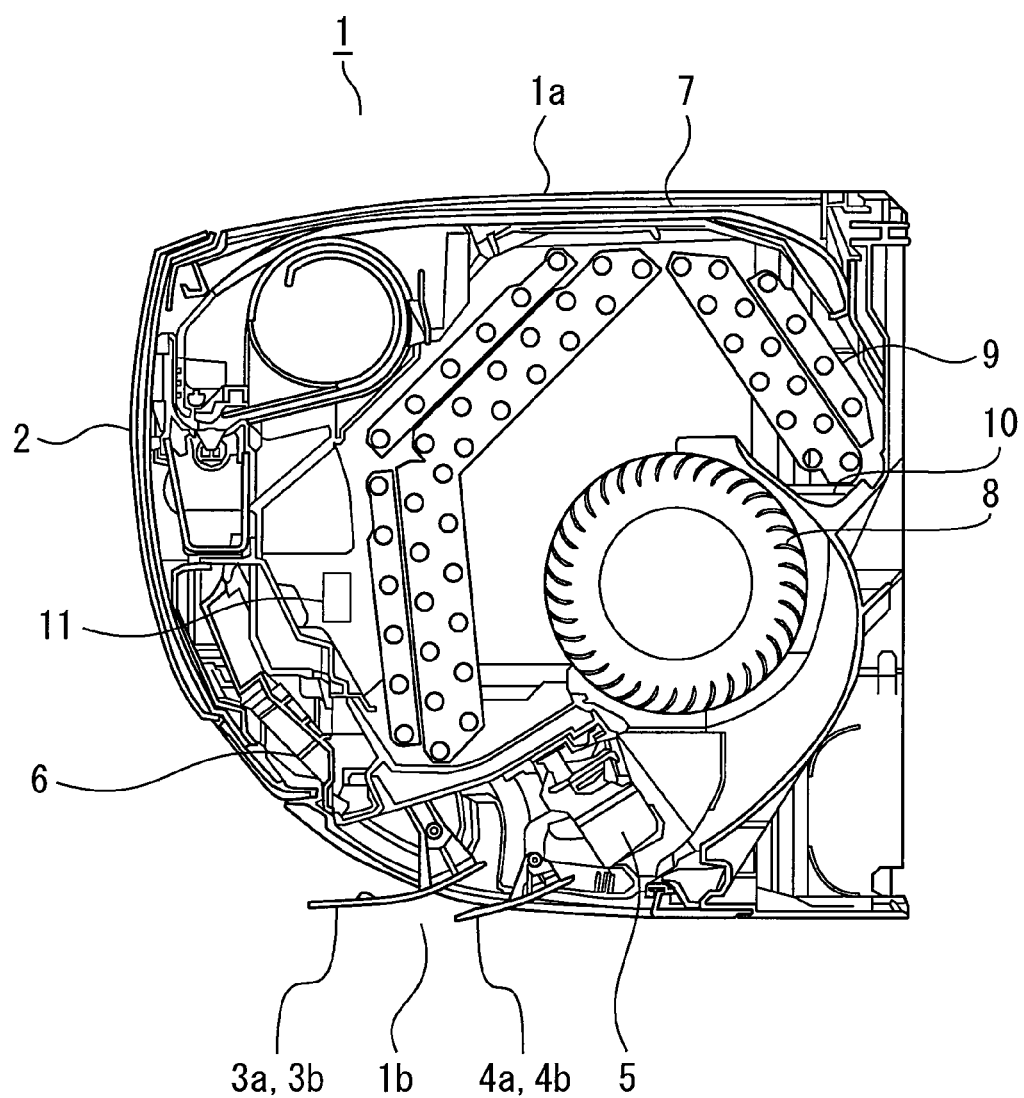
FIG. 5 is a vertical cross-sectional view of an inner portion of the air conditioner according to Embodiment 1 of the present invention.

As illustrated in FIGS. 3 and 4, an upper portion of the front surface of the body 1 is covered by a front panel 2. Below the front panel 2, vertical airflow direction vanes 3a and 3b are provided as upper vanes. The vertical airflow direction vanes 3a and 3b are separated from each other as the left side and the right side, respectively, with a narrow gap therebetween at a roughly center portion in a longitudinal direction (traverse direction of the air outlet 1b) as viewed from the front surface of the air conditioner. The vertical airflow direction vanes 3a are 3b are each formed so as to have a circular arc shape in cross-section.

In a portion in which the vertical airflow direction vanes 3a and 3b face each other, a support arm (not-illustrated) is provided. A strut (not-illustrated) is rotatably attached to the support arm via a pin (not-illustrated). On the side of each of the vertical airflow direction vanes 3a and 3b that is opposite to the portion in which the vertical airflow direction vanes 3a and 3b face each other, a support shaft (not-illustrated) is provided. The support shaft is detachably supported by a bearing (not-illustrated) in a side wall of the air outlet 1b. Each support shaft is provided so as to be able to independently rotate by means of driving of a motor.

Below the vertical airflow direction vanes 3a and 3b, vertical airflow direction vanes 4a and 4b are provided as lower vanes. The vertical airflow direction vanes 4a and 4b are provided on the back side of the air conditioner relative to the vertical airflow direction vanes 3a and 3b. The vertical airflow direction vanes 4a and 4b are separated from each other as the left side and the right side, respectively, with a narrow gap therebetween at the roughly center portion in the longitudinal direction (traverse direction of the air outlet 1b) as viewed from the front surface of the air conditioner. The vertical airflow direction vanes 4a and 4b are each formed so as to have a circular arc shape in cross-section.

In a portion in which the vertical airflow direction vanes 4a and 4b face each other, a support arm (not-illustrated) is provided. A strut (not-illustrated) is rotatably attached to the support arm via a pin (not-illustrated). On the side of each of the vertical airflow direction vanes 4a and 4b that is opposite to the portion in which the vertical airflow direction vanes 4a and 4b face each other, a support shaft (not-illustrated) is provided. The support shaft is detachably supported by a bearing (not-illustrated) in a side wall of the air outlet 1b. Each support shaft is provided so as to be able to independently rotate by means of driving of a motor.

On the back side of the vertical airflow direction vanes 3a, 3b, 4a and 4b, horizontal airflow direction vanes 5 are provided. The horizontal airflow direction vanes 5 are arranged in the longitudinal direction (traverse direction of the air outlet 1b) as viewed from the front surface of the air conditioner.

At a center of a lower portion of the front panel 2, a human detection sensor 6 is provided. The human detection sensor 6 may be provided at a left end portion of the body 1. The human detection sensor 6 has a function that performs scanning while horizontally moving a plurality of thermopiles arranged in a vertical direction.

The human detection sensor 6 has a function that obtains a plurality of thermal images by means of the scanning and thereby determines whether or not any human body is present, and discriminates between a skin-exposed portion and a skin-unexposed portion, from a difference in temperature from the background. The human detection sensor 6 also functions as an apparent temperature sensor that detects an apparent temperature. In this case, an apparent temperature can more easily be detected as a larger part of the skin of the human body is exposed. Also, the detection accuracy is higher as the number of pixels is larger. In this case, the human detection sensor 6 accurately grasps a position and a distance from the body 1 of the human body. For example, 700 pixels are enough for the human detection sensor 6 to recognize a position of a human body inside a room.

Note that a position of a human body can be picked out using a device other than thermopiles. For example, a position of a human body may be picked out using a device having a large number of pixels such as a camera. Also, although the detection accuracy is lower, an area in which a human body is present or a position of the human body (in a horizontal direction and a depth direction) may be picked out by means of a pyroelectric sensor using a Fresnel lens.

As illustrated in FIG. 5, below the air inlet 1a, a prefilter 7 is provided. Below the prefilter 7, a fan 8 is provided. The fan 8 is provided in such a manner that the fan 8 can be driven to rotate by a fan motor (not-illustrated). Between the prefilter 7 and the fan 8, a heat exchanger 9 is provided. At a lower portion of the heat exchanger 9, a drain pan 10 is provided.

Inside the body 1, a control section 11 is provided. Components such as the human detection sensor 6, the fan motor and the heat exchanger 9 are connected to the control section 11. In the control section 11, a time-series table is stored.

In the air conditioner, the control section 11 provides a command voltage to the fan motor based on time-series data. Based on the command voltage, the fan motor rotates while a rotation frequency thereof successively varies to a desired one. As a result, the fan 8 also rotates while a rotation frequency thereof successively varies to a desired one. As a result of the rotation, air inside the room is drawn in from the air inlet 1a. The air passes through the prefilter 7, the heat exchanger 9, the fan 8, an airflow path and the air outlet 1b in this order and thereby becomes blowing air. The blowing air is let out into the room.

In this case, the control section 11 orients the horizontal airflow direction vanes 5 toward the front of the human body based on a result of the detection by the human detection sensor 6. Consequently, the blowing air from the air outlet 1b is directed toward the front of the human body. This operation may be designated by a user via a remote controller.

Next, an example of operation of the vertical airflow direction vanes 3a, 3b, 4a and 4b will be described with reference to FIGS. 6 and 7.

Figure 6:
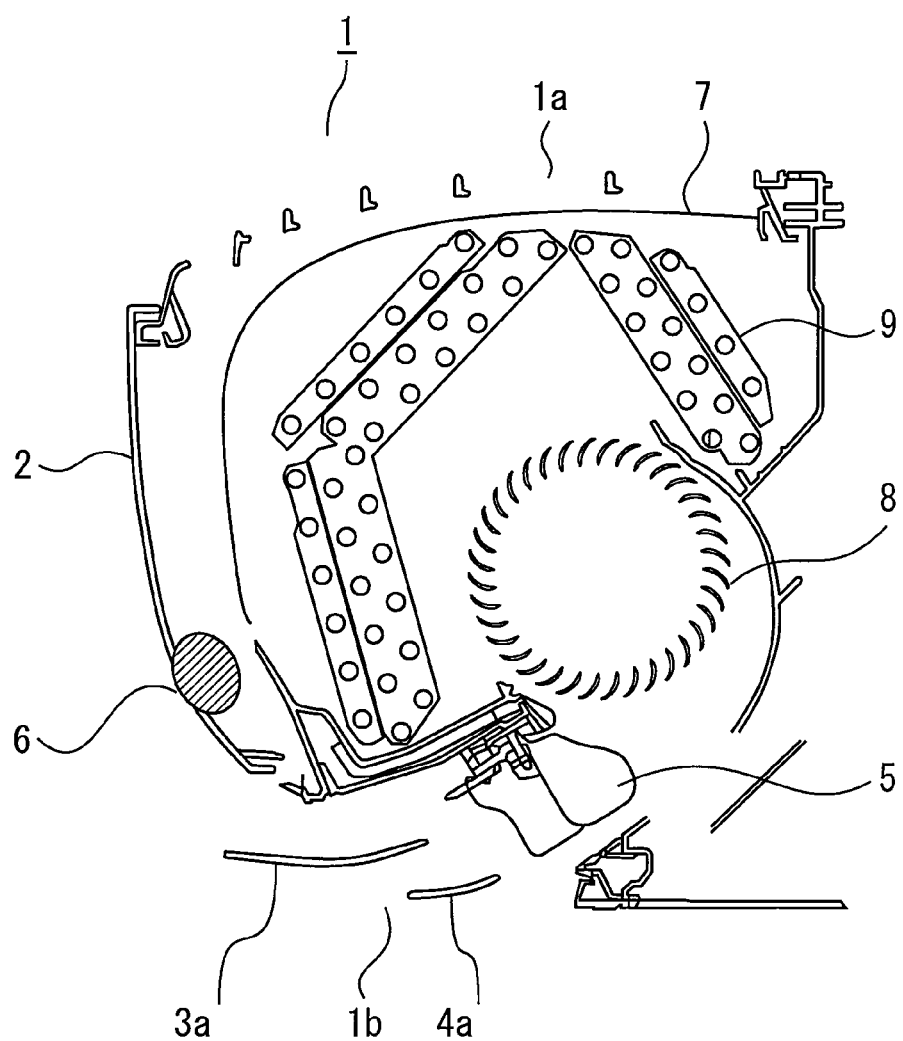
FIG. 6 is a vertical cross-sectional view of the left side of the air conditioner according to Embodiment 1 of the present invention.

FIG. 6 is a vertical cross-sectional view of the left side of the air conditioner according to Embodiment 1 of the present invention. FIG. 7 is a vertical cross-sectional view of the right side of the air conditioner according to Embodiment 1 of the present invention.

Figure 7:
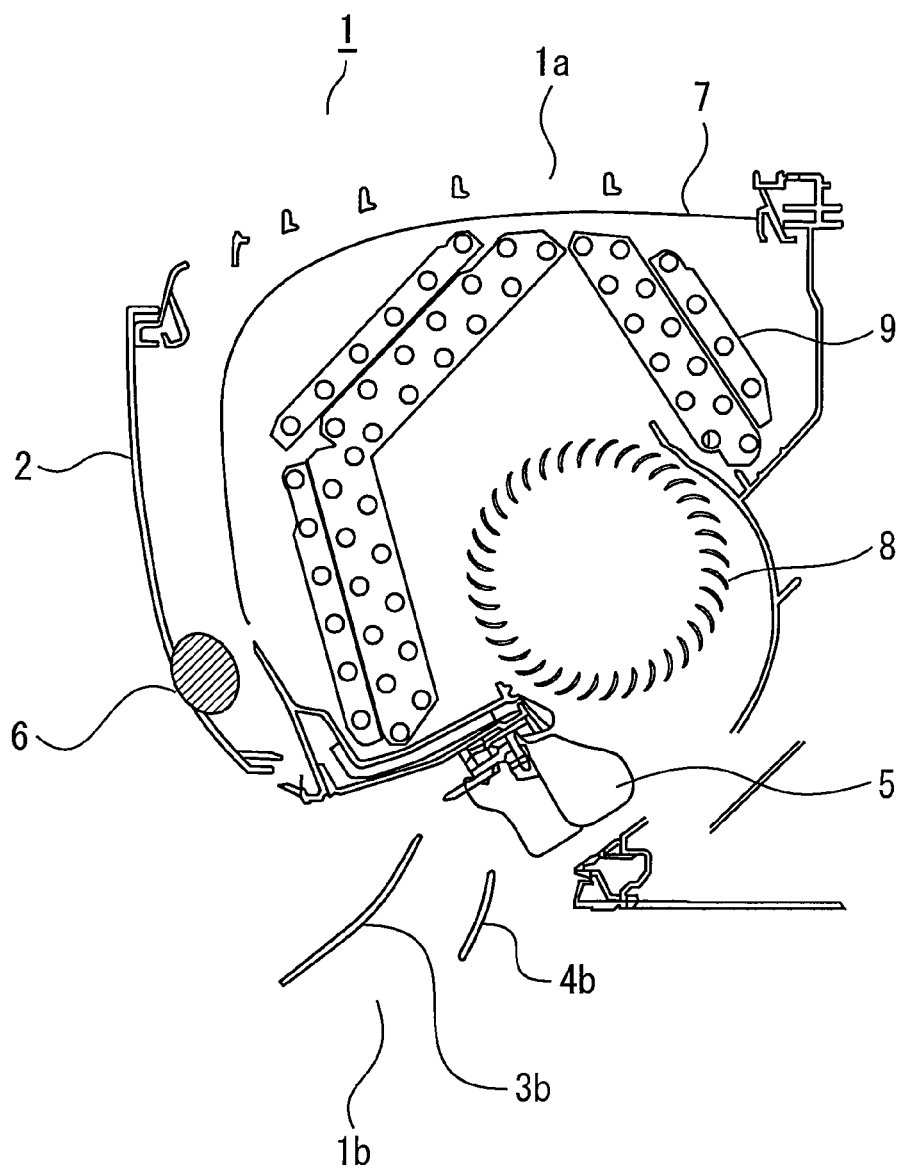
FIG. 7 is a vertical cross-sectional view of the right side of the air conditioner according to Embodiment 1 of the present invention.

At a certain point of time, when the left-side vertical airflow direction vanes 3a and 4a are oriented upward at a fixed angle as illustrated in FIG. 6, the control section 11 causes the right-side vertical airflow direction vanes 3b and 4b to be oriented downward at the same angle as illustrated in FIG. 7. In this case, the vertical airflow direction vanes 3a and 4a are oriented substantially horizontally to a floor surface. The vertical airflow direction vanes 3a and 4a may be oriented toward the face of a human body. On the other hand, the vertical airflow direction vanes 3b and 4b are oriented toward the vicinity of the feet of the human body. Consequently, the entirety of the human body is exposed to the airflow from the air outlet 1b.

At a certain point of time, when the left-side vertical airflow direction vanes 3a and 4a are oriented downward at a fixed angle, the control section 11 causes the right-side vertical airflow direction vanes 3b and 4b to be oriented upward at the same angle. In this case, the vertical airflow direction vanes 3a and 4a are oriented toward the feet of a human body. The vertical airflow direction vanes 3b and 4b are oriented substantially horizontally to the floor surface. The vertical airflow direction vanes 3b and 4b may be oriented toward the face of the human body. Consequently, the entirety of the human body is exposed to the airflow from the air outlet 1b.

Next, another example of operation of the vertical airflow direction vanes 3a, 3b, 4a and 4b will be described with reference to FIG. 8.

Figure 8:
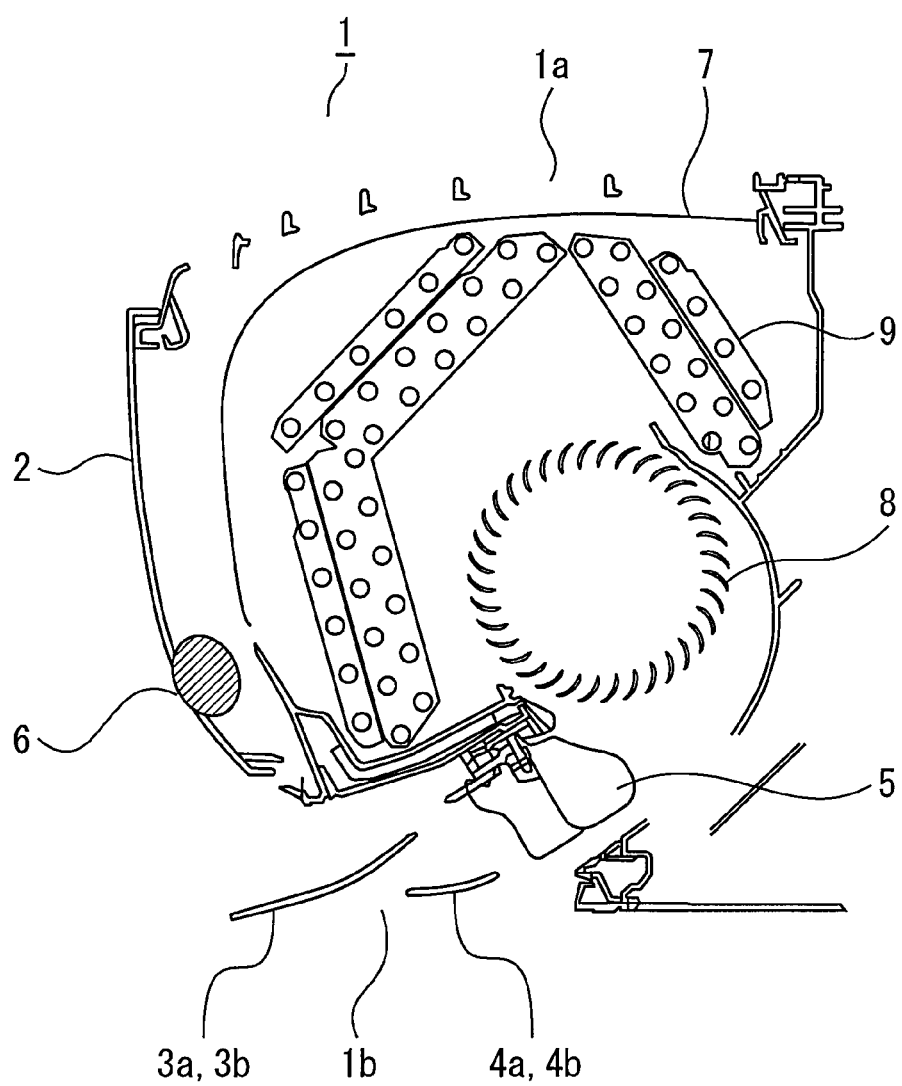
FIG. 8 is a vertical cross-sectional view of the air conditioner according to Embodiment 1 of the present invention.

FIG. 8 is a vertical cross-sectional view of the air conditioner according to Embodiment 1 of the present invention.

At a certain point of time, when the vertical airflow direction vanes 3a and 3b are oriented downward, the control section 11 causes the vertical airflow direction vanes 4a and 4b to be oriented upward. In this case, a space between the vertical airflow direction vanes 3a and 3b and the vertical airflow direction vanes 4a and 4b is narrowed. Consequently, rapid airflow is sometimes generated from the air outlet 1b. A part of the human body is exposed to the airflow.

Next, a rotation frequency of the fan motor will be described with reference to FIG. 9.

Figure 9:
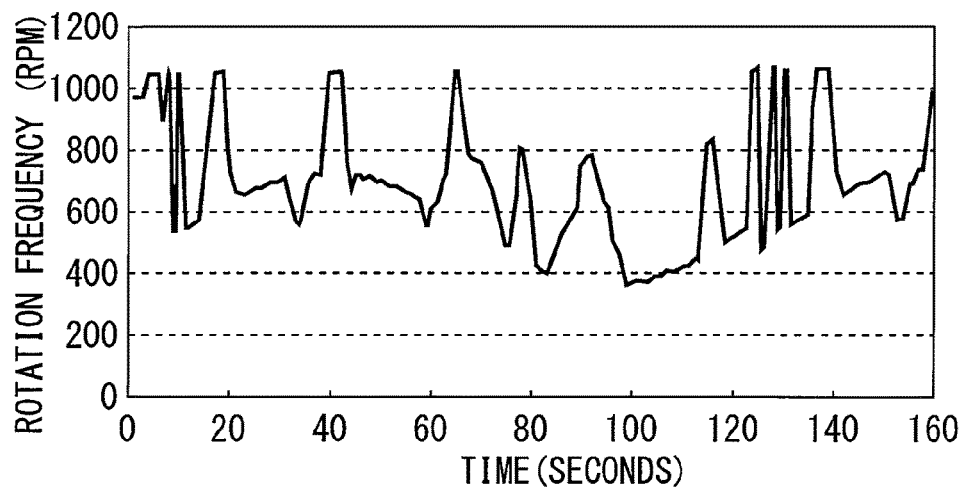
FIG. 9 is a diagram for describing temporal variation in rotation frequency of the fan motor in the air conditioner according to Embodiment 1 of the present invention.

FIG. 9 is a diagram for describing temporal variation in rotation frequency of the fan motor in the air conditioner according to Embodiment 1 of the present invention. The abscissa axis in FIG. 9 represents time (seconds). The ordinate axis in FIG. 9 represents the rotation frequency (rpm).

As illustrated in FIG. 9, the fan motor rotates at frequencies according to waves resulting from a combination of irregular sinusoidal waves. A waveform of the rotation frequencies corresponds to a waveform having an average frequency of no more than 1 Hz, the waveform including high-frequency waves. The high frequency waves are ones that provide repetitions of around ten to twenty vibrations per minute.

Next, a speed of blowing air at a position that is 2.5 m away from the body 1 will be described with reference to FIG. 10.

Figure 10:
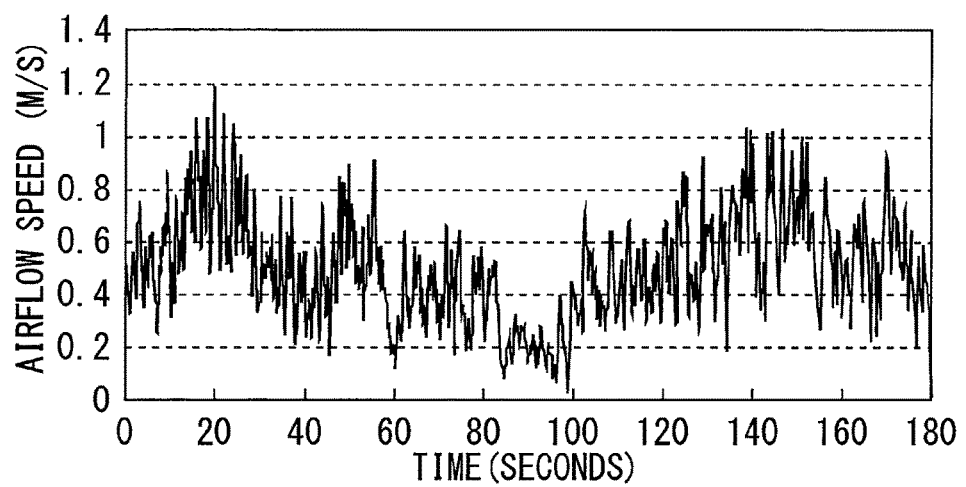
FIG. 10 is a diagram for describing temporal variation in speed of blowing air from the air conditioner according to Embodiment 1 of the present invention.

FIG. 10 is a diagram for describing temporal variation in speed of blowing air from the air conditioner according to Embodiment 1 of the present invention. The abscissa axis in FIG. 10 represents time (seconds). The ordinate axis in FIG. 10 represents the airflow speed (m/s).

As illustrated in FIG. 10, the airflow speed variation follows the variation in rotation frequency of the fan motor in FIG. 9. Consequently, the airflow speed variation is similar to airflow speed variation in the natural world.

Next, operation of the air conditioner will be described with reference to FIG. 11.

Figure 11:
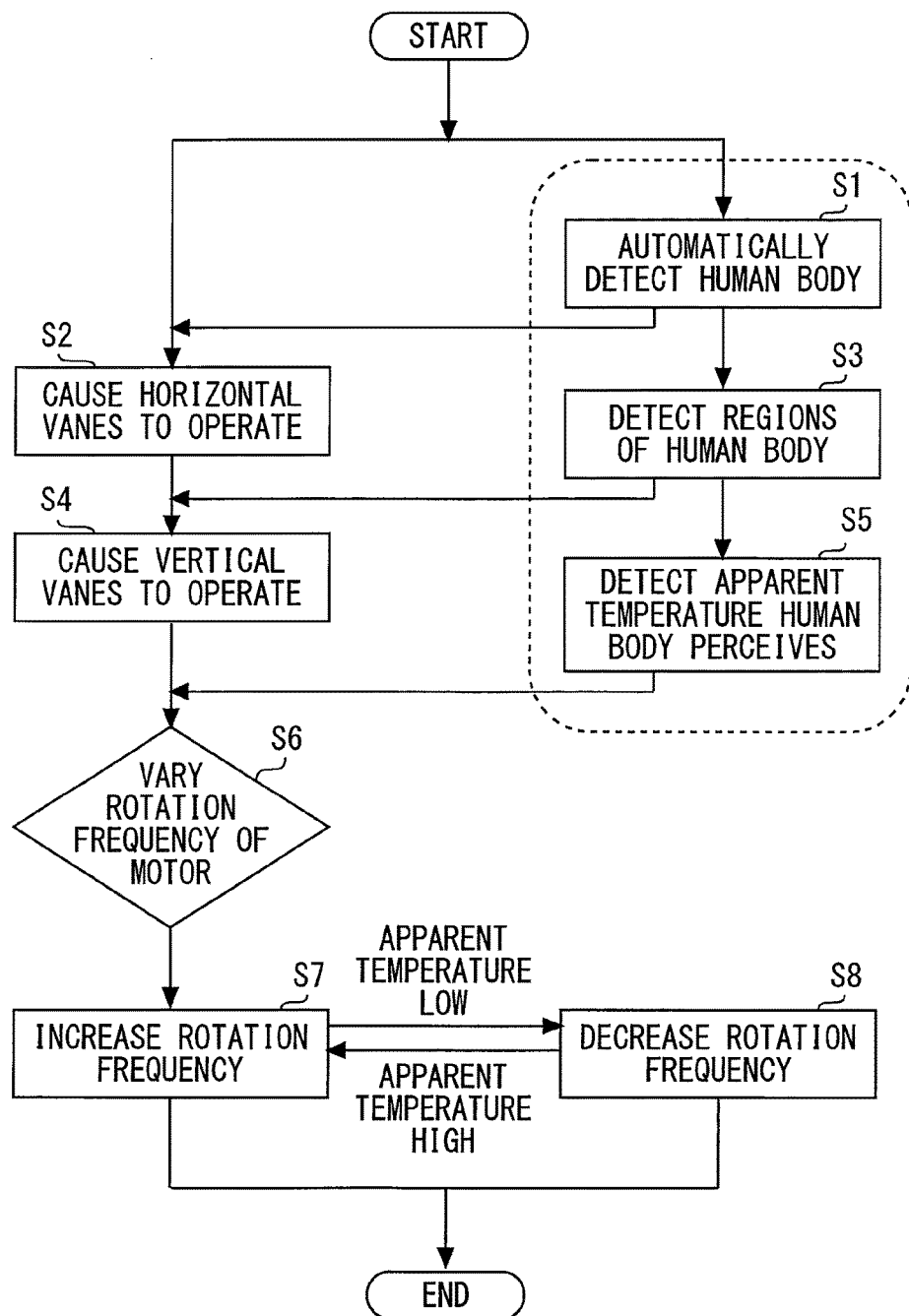
FIG. 11 is a flowchart for describing operation of the air conditioner according to Embodiment 1 of the present invention.

FIG. 11 is a flowchart for describing operation of the air conditioner according to Embodiment 1 of the present invention.

When a user starts operation of the air conditioner, the operation proceeds to step S1. In step S1, the human detection sensor 6 automatically detects a human body inside a room. Subsequently, in step S2, the control section 11 causes the horizontal airflow direction vanes 5 to operate based on a result of the detection in step S1. More specifically, the control section 11 adjusts positions of the horizontal airflow direction vanes 5 so that airflow is directed toward the human.

Subsequently, in step S3, the human detection sensor 6 detects regions of the human body inside the room. More specifically, the human detection sensor 6 calculates differences between a last background image and thermal image data including the human body. In this case, the human detection sensor 6 determines a differential area exceeding a threshold value A in the thermal image data as an area around the head of the human body (skin-exposed portion). The human detection sensor 6 determines a thermal image differential area that is adjacent to the area obtained using the threshold value A and exceeds a threshold value B (<threshold value A) as an area around the feet of the human body (skin-unexposed portion). In this case, the human detection sensor 6 does not determine a thermal image differential area that exceeds the threshold value B but is not adjacent to the area obtained using the threshold value A, as a human body.

Subsequently, in step S4, the control section 11 causes the vertical airflow direction vanes 3a, 3b, 4a and 4b to operate based on a result of the detection by step S3. More specifically, the control section 11 randomly adjusts positions of the vertical airflow direction vanes 3a, 3b, 4a and 4b as illustrated in FIGS. 6 to 8. The control section 11 may successively adjust the positions of the vertical airflow direction vanes 3a, 3b, 4a and 4b in a steady rhythm.

Subsequently, in step S5, the human detection sensor 6 detects an apparent temperature the human body perceives.

Subsequently, in step S6, the control section 11 varies the rotation frequency of the fan motor as illustrated in FIG. 9 based on a result of the detection in step S5. In this case, as indicated in step S7, the control section 11 increases or decreases the rotation frequency of the fan motor while the waveform in FIG. 9 is maintained. In other words, if the apparent temperature the human body perceives is low, the control section 11 relatively decreases a value of the rotation frequency of the fan motor. On the other hand, if the apparent temperature the human body perceives is high, the control section 11 relatively increases the value of the rotation frequency of the fan motor.

According to Embodiment 1 described above, when the rotation frequency of the fan is varying, the vertical airflow direction vanes 3a and 4a and the vertical airflow direction vanes 3b and 4b are driven separately from each other. Therefore, airflow simulating that in the natural world can be generated.

Also, the fan 8 rotates at frequencies according to waves resulting from a combination of irregular sinusoidal waves. More specifically, the fan 8 rotates at frequencies according to waves having an average frequency of no more than 1 Hz, the waves including high-frequency waves. Therefore, airflow that is closer to that in the natural world can be generated.

Also, when the left-side vertical airflow direction vanes 3a and 4a are oriented upward at a fixed angle, the right-side vertical airflow direction vanes 3b and 4b are oriented downward at the same angle. When the left-side vertical airflow direction vanes 3a and 4a are oriented downward at a fixed angle, the right-side vertical airflow direction vanes 3b and 4b are oriented upward at the same angle. Thus, airflow to be felt on the entire human body can be generated.

Also, a timing for changing the vertical angles of the left-side vertical airflow direction vanes 3a and 4a and the right-side vertical airflow direction vanes 3b and 4b is randomly set. In this case, airflow felt on the entire human body and airflow that sometimes becomes large are randomly generated. Thus, a user is prevented from being continuously exposed to stiff blowing air. Consequently, the user does not have an unpleasant feeling. Also, increase in dryness is avoided.

In this case, depending on the orientations of the vertical airflow direction vanes 3a and 3b and the vertical airflow direction vanes 4a and 4b, large airflow is sometimes generated. In this case, it is not necessary to sharply increase the rotation frequency of the fan motor. Thus, increase in sound of rotations of the fan motor and the fan 8 is prevented. In other words, the user is prevented from having a feeling of discomfort.

Also, the human detection sensor 6 detects a human body. Thus, airflow can more reliably be directed to the human body.

Also, the orientations of the horizontal airflow direction vanes 5 are changed based on a result of the detection by the human detection sensor 6. Thus, airflow can more reliably be directed to the human body in the horizontal direction.

Also, when the left-side vertical airflow direction vanes 3a and 4a are oriented toward the head of a human body, the right-side vertical airflow direction vanes 3b and 4b are oriented toward the feet of the human body. When the left-side vertical airflow direction vanes 3a and 4a are oriented toward the feet of the human body, the right-side vertical airflow direction vanes 3b and 4b are oriented toward the head of the human body. Thus, airflow that is felt on the entire human body can efficiently be generated.

Also, the fan 8 increases or decreases based on an apparent temperature detected by the human detection sensor 6. Thus, a user can be prevented from having a feeling of discomfort. In other words, comfort and a feeling of being refreshed are given to a user. In this case, mere fan operation enables provision of a feeling of being cool. In other words, a feeling of being cool can be given when the air conditioner is used as a blower without cooling operation being performed. Thus, energy consumption can be suppressed.

Note that a range of vertical swing of the left-side vertical airflow direction vanes 3a and 4a and the right-side vertical airflow direction vanes 3b and 4b may be designated by a user via a remote controller. In this case, natural blowing air toward a human body can more efficiently be generated.

Embodiment 2

Figure 12:
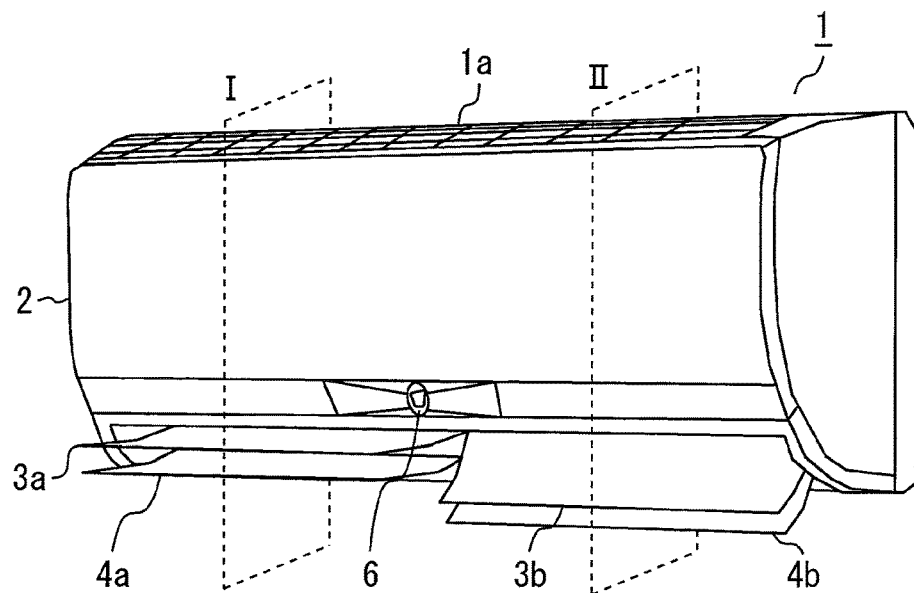
FIG. 12 is a front perspective view of an air conditioner according to Embodiment 2 of the present invention.
Figure 13:
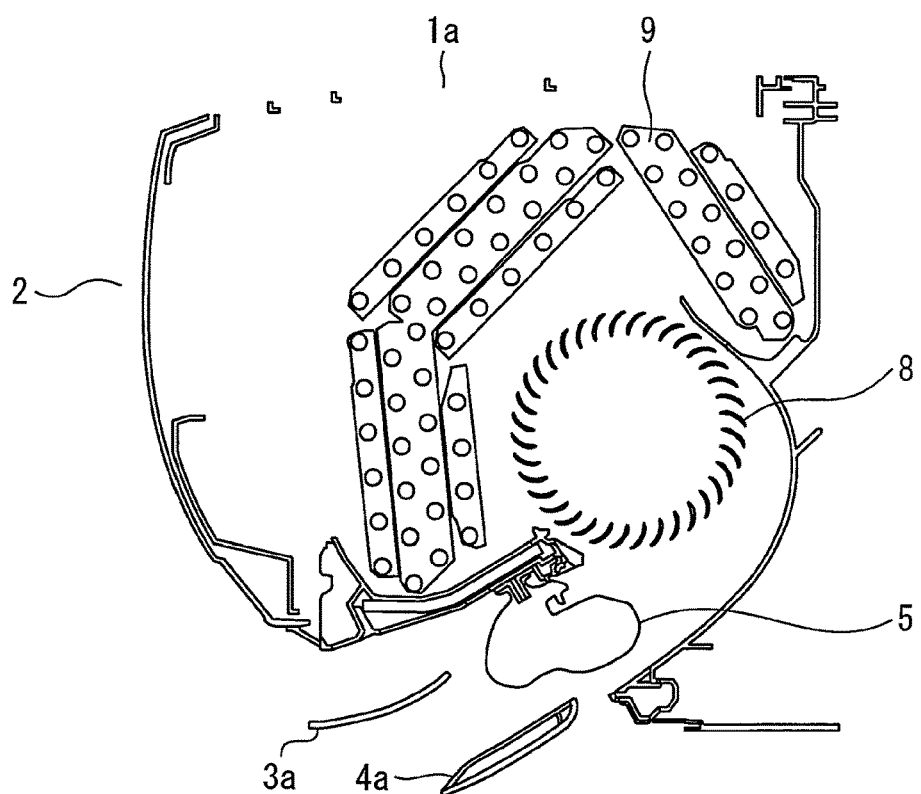
FIG. 13 is a vertical cross-sectional view of the left side of the air conditioner according to Embodiment 2 of the present invention.
Figure 14:
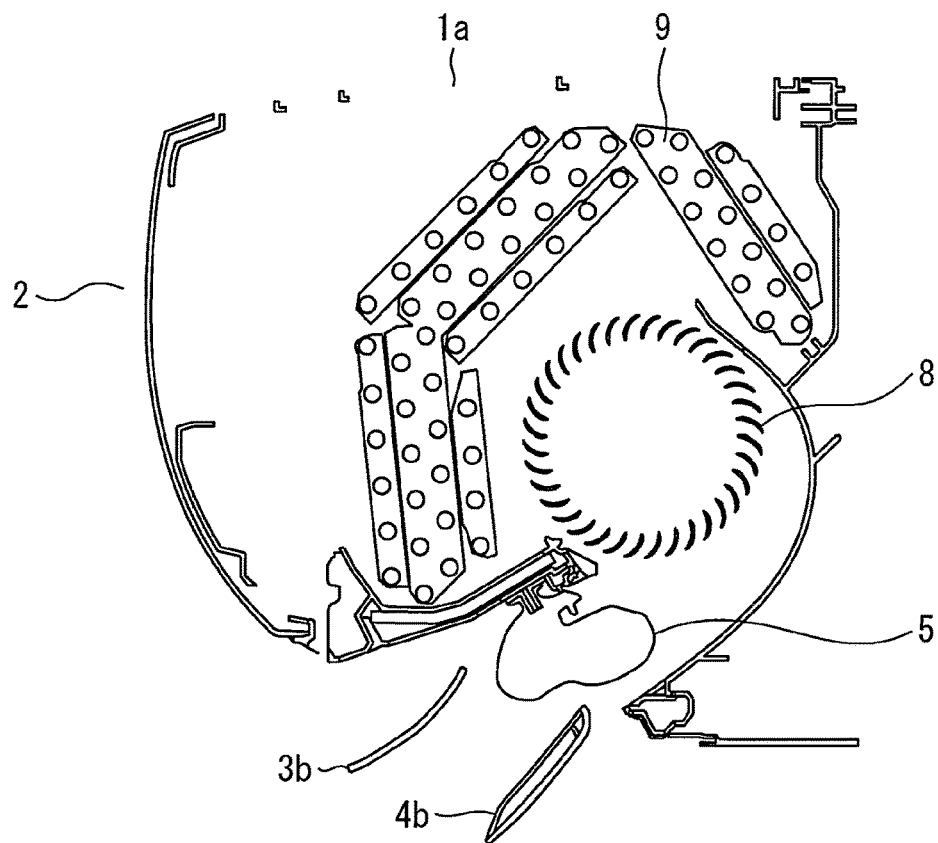
FIG. 14 is a vertical cross-sectional view of the right side of the air conditioner according to Embodiment 2 of the present invention.

FIG. 12 is a front perspective view of an air conditioner according to Embodiment 2 of the present invention. FIG. 13 is a vertical cross-sectional view of the left side of the air conditioner according to Embodiment 2 of the present invention. FIG. 14 is a vertical cross-sectional view of the right side of the air conditioner according to Embodiment 2 of the present invention. It should be noted that parts that are identical or correspond to those of Embodiment 1 are provided with reference numeral that are the same as those of Embodiment 1 and description thereof will be omitted.

FIG. 13 is a cross-sectional view of the air conditioner in FIG. 12 cut along plane I. As illustrated in FIG. 13, a vertical airflow direction vane 4a is provided on a rough extended line of a curved surface forming the back of an airflow path inside a body 1. The inside of the vertical airflow direction vane 4a is thermally insulated.

FIG. 14 is a cross-sectional view of the air conditioner in FIG. 12 cut along plane II. As illustrated in FIG. 14, a vertical airflow direction vane 4b is provided on a rough extended line of a curved surface forming the back of the airflow path inside the body 1. The vertical airflow direction vane 4b is thermally insulated.

Next, an example of operation of the vertical airflow direction vanes 3a, 3b, 4a and 4b will be described with reference to FIGS. 15 and 16.

Figure 15:
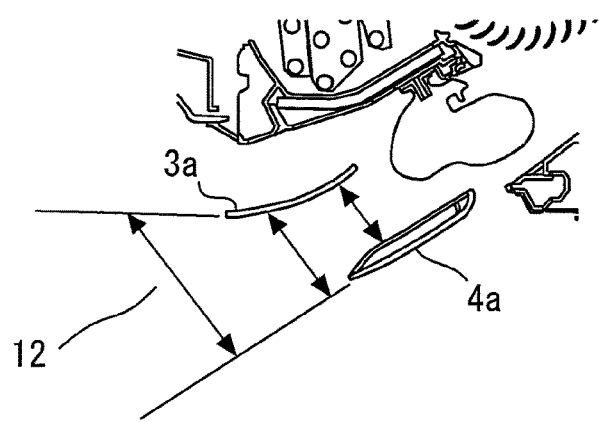
FIG. 15 is an enlarged view of a main part of the left side of the air conditioner according to Embodiment 2 of the present invention.

FIG. 15 is an enlarged view of a main part of the left side of the air conditioner according to Embodiment 2 of the present invention. FIG. 16 is an enlarged view of a main part of the right side of the air conditioner according to Embodiment 2 of the present invention.

Figure 16:
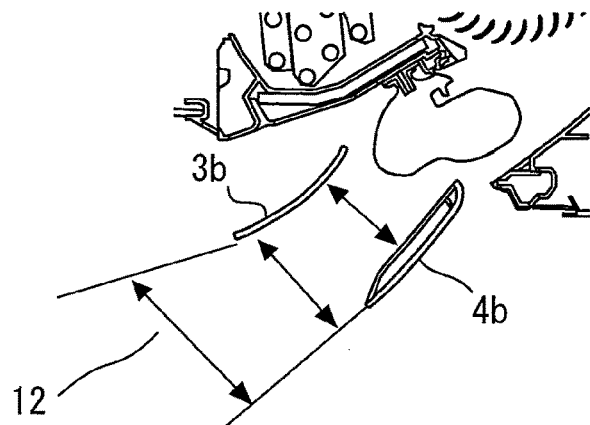
FIG. 16 is an enlarged view of a main part of the right side of the air conditioner according to Embodiment 2 of the present invention.

At a certain point of time, when left-side vertical airflow direction vanes 3a and 4a are oriented upward at a fixed angle as illustrated in FIG. 15, a control section 11 causes the right-side vertical airflow direction vanes 3b and 4b to be oriented downward as illustrated in FIG. 16. In this case, the vertical airflow direction vanes 3a, 4a, 3b and 4b are arranged at different angles relative to a horizontal plane.

As illustrated in FIG. 15, on the left side of the air conditioner, blowing air 12 is formed along the vertical airflow direction vanes 3a and 4a. Here, the blowing air 12 gradually expands from the upstream side toward the downstream side of the airflow path.

As illustrated in FIG. 16, on the right side of the air conditioner, blowing air 12 is formed along the vertical airflow direction vanes 3b and 4b. Here, the blowing air 12 gradually expands from the upstream side toward the downstream side of the airflow path.

At a certain point of time, when the left-side vertical airflow direction vanes 3a and 4a are oriented downward at fixed angles, the control section 11 causes the right-side vertical airflow direction vanes 3b and 4b to be oriented upward. In this case, the vertical airflow direction vanes 3a, 4a, 3b and 4b are arranged at different angles relative to a floor surface.

On the left side of the air conditioner, blowing air 12 is formed along the vertical airflow direction vanes 3a and 4a. Here, the blowing air 12 gradually expands from the upstream side toward the downstream side of the airflow path.

On the right side of the air conditioner, blowing air 12 is formed along the vertical airflow direction vanes 3b and 4b. Here, the blowing air 12 gradually expands from the upstream side toward the downstream side of the airflow path.

Here, as in Embodiment 1, a rotation frequency of a fan 8 may be varied.

According to Embodiment 2 described above, each of the orientations of the vertical airflow direction vanes 3a, 3b, 4a and 4b is set to a fixed angle. Thus, blowing air 12 that is wide in a vertical direction can be generated.

Also, the vertical airflow direction vanes 3a, 4a, 3b and 4b are arranged at different angles relative to a horizontal plane. Thus, left and right blowing airs 12 draw each other in. Here, the left and right blowing airs 12 form vertically long airflow while involving circumambient air. The airflow can be felt by the entirety of a human body. Thus, natural blowing air can efficiently be given to a user. Consequently, comfort and a feeling of being refreshed can be given to the user.

Note that the angles of the left-side vertical airflow direction vanes 3a and 4a and the angles of the right-side vertical airflow direction vanes 3b and 4b may be interchanged regularly or irregularly. In this case, also, natural blowing air can efficiently be given to a user. Consequently, comfort and a feeling of being refreshed can be given to the user.

Embodiment 3

Figure 17:
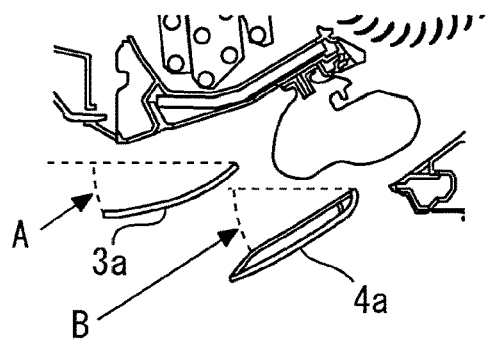
FIG. 17 is an enlarged view of a main part of the left side of an air conditioner according to Embodiment 3 of the present invention.
Figure 18:
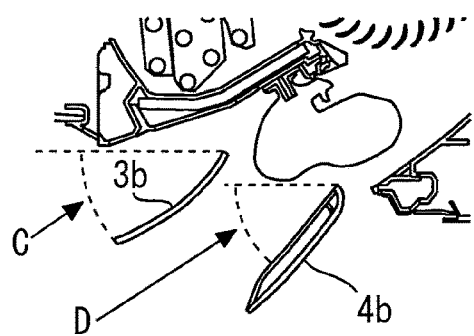
FIG. 18 is an enlarged view of a main part of the right side of the air conditioner according to Embodiment 3 of the present invention.

FIG. 17 is an enlarged view of a main part of the left side of an air conditioner according to Embodiment 3 of the present invention. FIG. 18 is an enlarged view of a main part of the right side of the air conditioner according to Embodiment 3 of the present invention. Note that parts that are identical or correspond to those of Embodiments 1 and 2 are provided with reference numeral that are the same as those of Embodiments 1 and 2 and description thereof will be omitted.

At a certain point of time, when left-side vertical airflow direction vanes 3a and 4a are oriented upward at respective fixed angles as illustrated in FIG. 17, the control section 11 causes right-side vertical airflow direction vanes 3b and 4b to be oriented downward as illustrated in FIG. 18. In this case, the vertical airflow direction vanes 3a, 4a, 3b and 4b are arranged at different angles relative to a horizontal plane.

For example, the vertical airflow direction vane 3a is arranged at angle A relative to a horizontal plane on the lower side of the horizontal plane. The vertical airflow direction vane 4a is arranged at angle B relative to the horizontal plane on the lower side of the horizontal plane. The vertical airflow direction vane 3b is arranged at angle C relative to the horizontal plane on the lower side of the horizontal plane. The vertical airflow direction vane 4b is arranged at angle D relative to the horizontal plane on the lower side of the horizontal plane.

The respective angles are set so that the ascending order of the angles is the order of angle A, angle C, angle B, and angle D. The respective angles are set so that a difference between angle B and angle D is larger than a difference between angle A and angle C. For example, the difference between angle A and angle C is preferably approximately 5 degrees. For example, the difference between the angle B and the angle D is preferably approximately 15 degrees.

At a certain point of time, when the left-side vertical airflow direction vanes 3a and 4a are oriented downward at respective fixed angles, the control section 11 causes the right-side vertical airflow direction vanes 3b and 4b to be oriented upward. In this case, the vertical airflow direction vanes 3a, 4a, 3b and 4b are arranged at different angles relative to a floor surface.

For example, the vertical airflow direction vane 3a is arranged at angle A relative to a horizontal plane on the lower side of the horizontal plane. The vertical airflow direction vane 4a is arranged at angle B relative to the horizontal plane on the lower side of the horizontal plane. The vertical airflow direction vane 3b is arranged at angle C relative to the horizontal plane on the lower side of the horizontal plane. The vertical airflow direction vane 4b is arranged at angle D relative to the horizontal plane on the lower side of the horizontal plane.

The respective angles are set so that the ascending order of the angles is the order of angle A, angle C, angle B, and angle D. The respective angles are set so that the difference between angle B and angle D is larger than the difference between angle A and angle C. For example, the difference between angle A and angle C is preferably approximately 5 degrees. For example, the difference between angle B and angle D is preferably approximately 15 degrees.

Here, as in Embodiments 1 and 2, a rotation frequency of a fan 8 may be varied.

According to Embodiment 3 described above, for example, the respective angles are set so that the ascending order of the angles is the order of angle A, angle C, angle B, and angle D. For example, the angles are set so that the ascending order of the angles is the order of angle C, angle A, angle D, and angle B. Here, the respective angles are set so that the difference between angle B and angle D is larger than the difference between angle A and angle C. In these cases, airflow having a larger width in a vertical direction can be generated. Consequently, natural blowing air can efficiently be given to a user. Consequently, comfort and a feeling of being refreshed can more reliably be provided to the user.

Note that the angles of the left-side vertical airflow direction vanes 3a and 4a and the angles of the right-side vertical airflow direction vanes 3b and 4b may be interchanged regularly or irregularly. In this case, also, natural blowing air can efficiently be given to a user. Consequently, comfort and a feeling of being refreshed can more reliably be given to the user.

Embodiment 4

Figure 19:
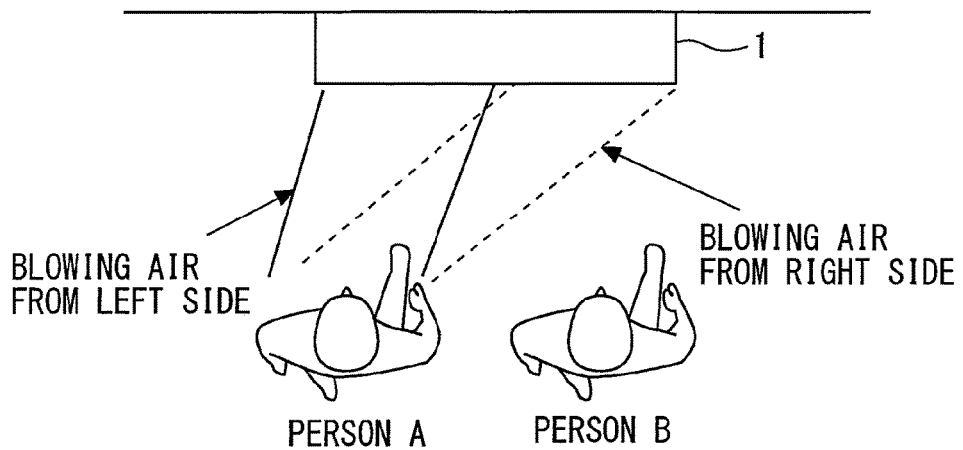
FIG. 19 is a plan views of the inside of a room equipped with an air conditioner according to Embodiment 4 of the present invention.
Figure 20:
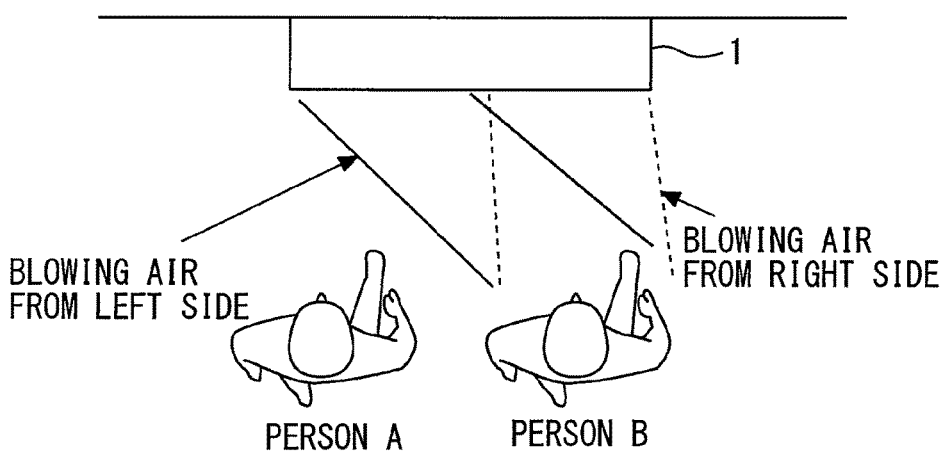
FIG. 20 is a plan views of the inside of the room equipped with the air conditioner according to Embodiment 4 of the present invention.

FIGS. 19 and 20 are plan views of the inside of a room equipped with an air conditioner according to Embodiment 4 of the present invention. Note that parts that are identical or correspond to those of Embodiments 1 to 3 are provided with reference numeral that are the same as those of Embodiments 1 to 3 and description thereof will be omitted.

As illustrated in FIGS. 19 and 20, on the left side of an area in front of a body 1, person A is present. On the right side of the area in front of the body 1, person B is present. In this case, a human detection sensor 6 detects that person A and person B are present, by means of scanning Here, a control section 11 horizontally varies a direction of horizontal airflow direction vanes 5 between person A and person B.

For example, as illustrated in FIG. 19, when the horizontal airflow direction vanes 5 are oriented leftward, the entire body of person A is exposed to vertically-long airflow. Here, the control section 11 interchanges angles of vertical airflow direction vanes 3a and 3b and angles of vertical airflow direction vanes 4a and 4b.

For example, as illustrated in FIG. 20, when the horizontal airflow direction vanes 5 are oriented rightward, the entire body of person B is exposed to vertically-long airflow. Here, the control section 11 interchanges the angles of the vertical airflow direction vanes 3a and 3b and the angles of the vertical airflow direction vanes 4a and 4.

According to Embodiment 4 described above, the control section 11 horizontally varies the direction of the horizontal airflow direction vanes 5 between person A and person B. Thus, airflow can be delivered to person A and person B, alternately.

Also, when person A or person B is exposed to airflow, the angles of the vertical airflow direction vanes 3a and 3b and the angles of the vertical airflow direction vanes 4a and 4b are interchanged. Here, at a timing of the angles of the vertical airflow direction vanes 3a and 3b and the angles of the vertical airflow direction vanes 4a and 4b corresponding to each other, the airflow speed increases. Thus, a stronger feeling of being exposed to blowing air is given. Consequently, a cooling effect provided by the airflow can be increased. In this case, cooling insufficiency because of there being time during which no blowing air is delivered can be compensated.

Note that the horizontal airflow direction vanes 5 can be made to operate so as to deliver airflow to each of three or more persons.

INDUSTRIAL APPLICABILITY

As described above, a blower and an air conditioner according to the present invention can be used for a system that generates airflow simulating that in the natural world.

DESCRIPTION OF SYMBOLS

1 body, 1a air inlet, 1b air outlet, 2 front panel, 3a, 3b vertical airflow direction vane, 4a, 4b vertical airflow direction vane, 5 horizontal airflow direction vane, 6 human detection sensor, 7 prefilter, 8 fan, 9 heat exchanger, 10 drain pan, 11 control section, 12 blowing air

The invention claimed is:

1. A blower comprising:
   a fan configured to generate blowing air;
   a pair of vertical airflow direction vanes provided on a front side of the fan, each of the vertical airflow direction vanes having a left side separated from a right side, the pair of vertical airflow direction vanes directing the blowing air generated by the fan upwardly or downwardly out of the fan, and each of the vertical airflow direction vanes including an upper vane and a lower vane vertically arranged; and
   a control section configured to drive the pair of vertical airflow direction vanes separately, the control section causing the pair of vertical airflow direction vanes to operate with a difference between the angle of the right-side lower vane relative to a horizontal plane and the angle of the left-side lower vane relative to the horizontal plane is larger than a difference between the angle of the right-side upper vane relative to the horizontal plane and the angle of the left-side upper vane relative to the horizontal plane.

2. The blower according to claim 1, wherein the control section causes the fan to rotate at frequencies according to waves resulting from a combination of irregular sinusoidal waves.

3. The blower according to claim 2, wherein the control section causes the fan to rotate at frequencies according to waves having an average frequency of no more than 1 Hz, the waves including a high-frequency wave.

4. The blower according to claim 1, wherein the control section randomly sets a timing for varying vertical angles of the pair of vertical airflow direction vanes.

5. The blower according to claim 1, comprising an apparent temperature sensor configured to detect an apparent temperature a human body perceives,
   wherein the control section increases or decreases the rotation frequency of the fan based. on the apparent emperature detected by the apparent temperature sensor.

6. An air conditioner comprising a blower according to claim 1.

* * * * *